(12) United States Patent
Bulpett et al.

(10) Patent No.: US 7,119,127 B2
(45) Date of Patent: Oct. 10, 2006

(54) GOLF BALLS CONTAINING CIS-TO-TRANS CONVERTED POLYBUTADIENE AND METHODS FOR MAKING SAME

(75) Inventors: David A. Bulpett, Boston, MA (US); Peter R. Voorheis, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 26 days.

(21) Appl. No.: 10/807,846

(22) Filed: Mar. 24, 2004

(65) Prior Publication Data
US 2005/0215729 A1     Sep. 29, 2005

(51) Int. Cl.
*A63B 37/06*    (2006.01)
*C08J 3/28*    (2006.01)

(52) U.S. Cl. .......................... 522/55; 522/49; 522/67; 522/158; 473/371

(58) Field of Classification Search ................ None
See application file for complete search history.

(56) References Cited

U.S. PATENT DOCUMENTS

| | | | |
|---|---|---|---|
| 2,878,175 A * | 3/1959 | Golub | 522/54 |
| 3,896,102 A | 7/1975 | Naylor | 260/94.3 |
| 3,926,933 A | 12/1975 | Naylor | 260/94.3 |
| 4,020,007 A | 4/1977 | Naylor | 252/429 |
| 4,020,008 A | 4/1977 | Naylor | 252/429 |
| 4,020,115 A | 4/1977 | Hargis et al. | 260/632 |
| 4,931,376 A | 6/1990 | Ikematsu et al. | 526/164 |
| 5,861,465 A | 1/1999 | Hamada et al. | 525/332.6 |
| 6,018,007 A | 1/2000 | Lynch | 523/164 |
| 6,130,295 A * | 10/2000 | Yokota | 525/221 |
| 2002/0119834 A1 * | 8/2002 | Bissonnette et al. | 473/371 |
| 2002/0119837 A1 * | 8/2002 | Bissonnette et al. | 473/378 |

\* cited by examiner

*Primary Examiner*—David J. Buttner
(74) *Attorney, Agent, or Firm*—William B. Lacy

(57) ABSTRACT

A golf ball having at least a core and a cover, wherein at least a portion of the ball is formed from a material resulting from the isomerization of an amount of polybutadiene in solution to create a resulting polybutadiene having an increased content of trans-polybutadiene, is disclosed. Isomerization can be accomplished by mixing a photo-sensitizer into the polybutadiene solution and exposing the resulting mixture to a radiation source such as ultraviolet radiation. Isomerization can also be accomplished thermally by mixing nitrogen dioxide into a sufficiently heated solution of polybutadiene and maintaining the mixture at an elevated temperature for a sufficient period of time to increase the trans-polybutadiene content of the polymer. The resulting polybutadiene is recovered, mixed with other additives as desired and formed into one or more portions of a golf ball.

9 Claims, 1 Drawing Sheet

GOLF BALLS CONTAINING CIS-TO-TRANS CONVERTED POLYBUTADIENE AND METHODS FOR MAKING SAME

TECHNICAL AREA

The present invention relates to cis-to-trans, solution-converted polybutadiene for use in golf balls.

BACKGROUND

A variety of golf balls designed to provide a wide range of playing characteristics, i.e., the compression, velocity, "feel," and spin, that can be optimized for various playing ability, are known in the prior art. Conventional golf balls include solid golf balls having one or more layers. Configurations of solid golf balls include one-piece balls, two-piece balls and multilayer golf balls. One-piece balls are generally easy to manufacture and relatively inexpensive. However, one-piece balls have poor playing characteristics and are typically limited for use as range balls. Two-piece balls are constructed with a solid core and a cover surrounding the core. The durability and driving distance associated with two-piece balls makes them very popular with recreational golfers. Balls having a two-piece construction are commonly formed of a polymeric core encased by a cover. Although two-piece balls are generally easy to manufacture and popular with recreational golfers, two-piece balls have limited playing characteristics. Multilayer golf balls contain a solid core having one or more layers and a cover surrounding the core. The cover may also contain one or more layers. Multilayer golf balls provide an extended range of playing characteristics over two-layer balls.

In addition to the configuration of the core and cover of solid golf balls, the materials that make up the core and cover also affect the playing characteristics of solid golf balls. One of the most common polymer components used in golf ball construction is polybutadiene, in particular polybutadiene having a high cis-isomer concentration. The use of a polybutadiene having a high cis concentration in a golf ball core results in a very resilient and rigid golf ball, especially when coupled with a hard cover material. These highly resilient golf balls have a relatively hard "feel" when struck by a club. Often, a softer feel is desired; however, soft feel golf balls constructed with a high cis concentration polybutadiene have low resilience. Since, resilience is sacrificed for ball feel, other formulations of polybutadiene have been attempted to provide golf balls having both improved resilience and a soft feel.

Polybutadiene, or butadiene rubber, having a high trans content, for example from about 20% to about 60%, and a low vinyl content, for example less than about 5% or preferably less than about 2%, exhibits superior resilience at a given compression. In addition, this polybutadiene has a high molecular weight, for example greater than about 350,000 and preferably greater than about 500,000, and a low polydispersity, for example a molecular weight distribution less than about 3 preferably less than about 2.

The desired trans content or isomer ratio in the polybutadiene can be achieved by cis-to-trans conversion. For example, the polybutadiene can be converted from cis-to-trans when the polybutadiene is cured. Cis-to-trans conversion during cure, however, results in a trans gradient that roughly mirrors the cure gradient, because the two chemical reactions occur simultaneously, making it difficult to alter or reverse the trans gradient. Alternatively, polybutadiene can be directly polymerized to the desired isomer ratio. The direct polymerization method, however, can result in reduced molecular weight and high polydispersity, among others. In another method, a polybutadiene having a high trans content, greater than about 90%, is solution blended with a polybutadiene having high cis content, greater than about 90%. However, due to the incompatibility of these two polymers, crystallinity, which is believed to be bad for golf ball properties, is not completely eliminated.

For example, polymers that have a high percentage of the trans-polybutadiene conformation, such as DIENE 35NF, from Firestone Corp., that has 40 percent cis-isomer and 50 percent trans-polybutadiene isomer, and mixtures of high-cis and high-trans-polybutadiene isomers, such as CARIFLEX BR1220, from Shell Corporation, and FUREN 88, from Asahi Chemical Co., respectively, typically do not yield high resilience values and therefore are not desirable.

It is thus desired to prepare golf balls having lower compression, i.e., a softer ball, while having the same or higher resilience than conventional balls. It is alternatively desired to obtain the same or lower compression while achieving greater resilience. To this end, it is believed that solution converted, post-polymerization of polybutadiene will avoid the above-mentioned problems exhibited by conventional trans polybutadiene processing and will yield superior golf ball materials.

SUMMARY OF THE INVENTION

The present invention is directed to golf balls having low compression and high resilience. The golf balls include one-piece golf balls, two-piece golf balls having a core and a cover surrounding the core, and multilayer golf balls having one or more layers in a core and one or more layers in a cover. One or more layers of the core or cover contain butadiene rubber that has been converted, in solution from a primarily cis-polybutadiene to a substantially increased trans-polybutadiene content. In one embodiment, the polybutadiene is left in solution and mixed with a photo-sensitizer and exposed to a radiation source under a nitrogen atmosphere, resulting in an increased trans-polybutadiene content polymer. In another embodiment, the original solution of primarily cis-polybutadiene is thermally isomerized by heating the solution, mixing nitrogen dioxide with the heated solution and maintaining the mixture at an elevated temperature under an argon atmosphere for a period of time necessary to form the trans-polybutadiene polymer. The resulting solution-converted polybutadiene is recovered from the solution and is formed into the desired golf ball component. The solution-converted polybutadiene can also be combined with other additives including other polymers including non solution-converted polybutadiene, additives, density-modifying fillers and nano-particles.

In accordance to an aspect of the present invention, a substantial amount of cis-isomer to trans-isomer conversion occurs after polymerization.

The solution-converted trans-polybutadiene reaction product contains less than about 7 percent vinyl isomer content based on the total polybutadiene. Preferably, the solution-converted trans-polybutadiene reaction product contains less than about 4 percent vinyl isomer. More preferably, the polybutadiene reaction product includes less than about 2 percent vinyl isomer. In addition, the solution-converted polybutadiene polymer is substantially free of crosslinking, gel formation and cyclization.

In one embodiment, the polymeric composite comprises at least one polyisoprene polymer. In a preferred embodiment, the at least one polyisoprene polymer has a trans-isomer content of at least about 10 percent. One preferred embodiment includes a polymeric composite including a blend of the at least one polyisoprene polymer and at least one other rubber polymer, such as polybutadiene or balata, in at least a portion of a golf ball.

The solution-converted butadiene rubber in accordance with the present invention reduces or eliminates the need for additional trans conversion during core curing. It also gives one the ability to de-couple the cure gradient from the trans gradient of a core, providing for example, higher trans content than could be achieved via in situ trans conversion in the relatively soft center of a core, where it can achieve the highest benefit. Other trans conversion agents (such as DTDS and zinc pentachlorothiophenol) can be omitted from the core formula, as well as the other processes associated with in situ trans conversion, such as tailoring the peroxide package and level, to the catalyst type and level.

DETAILED DESCRIPTION

Figure 1:
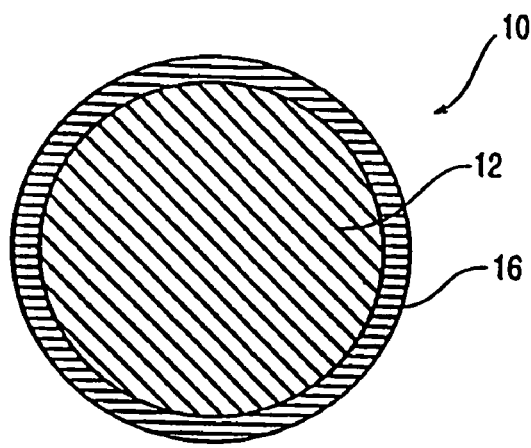
FIG. 1 illustrates a cross-sectional view of a two-piece golf ball having a cover and a core according to the invention.

A golf ball in accordance with the present invention has a solid core. Suitable solid core golf balls include one-piece golf balls, two-piece golf balls having a core and a cover surrounding the core and multilayer golf balls having a core made up of one or more substantially concentric intermediate layers and a cover surrounding the core and made up of one or more layers that are also substantially concentric with the core. At least one of the core or cover layers is formed from polybutadiene that has relatively high trans content and low vinyl content. In addition to butadiene rubber, golf balls in accordance with the present invention can be formed from isoprene rubber and natural rubber.

In one embodiment, high cis, low vinyl butadiene rubber, preferably having a high molecular weight and low polydispersity and low branching is converted after polymerization and in solution to a butadiene rubber having a trans content that is higher than the trans content before conversion. The cis content after conversion is lower than the cis content before conversion. Preferably, the polybutadiene has been solution converted, post polymerization, from a primarily cis content, cis-1,4-polybutadiene, to an increased trans content. Although the polybutadiene can also be converted in a solid state, conversion is preferably performed after polymerization but when the polymer is still in solution.

In one embodiment, a relatively high molecular weight primarily cis-polybutadiene is used. The primarily cis-polybutadiene material typically has a molecular weight of greater than about 200,000. Preferably, the primarily cis-polybutadiene molecular weight is greater than about 250,000, more preferably between about 300,000 and 500,000. Initially before conversion, the polybutadiene has a cis content of at least about 25%. In another embodiment, the initial cis content of the polybutadiene is from about 50% up to about 90%. Preferably, the initial cis content of the polybutadiene is about 95%. Preferably, the initial trans content of the polybutadiene is less than the initial cis content. In one embodiment, the initial trans content is least than about 10%, preferably less than about 5%.

Following conversion, the amount of cis content in the polybutadiene to be used in golf balls is less than the cis content before conversion, and the trans content following conversion is greater than the trans content before conversion. In one embodiment, the amount of cis content is less than about 80%. Preferably, the cis content is less than about 70%, and more preferably less than about 60%. The trans content is from about 20% up to at least about 60%. Preferably, the trans content is at least about 20%. Preferably, no other structural changes, for example cyclization and crosslinking, occur in the polymer molecules during the cis-to-trans isomerization. The vinyl content preferably stays the same or is reduced after conversion.

In order to form a golf ball containing the high trans, low vinyl polybutadiene in accordance with the present invention, an amount of polybutadiene is polymerized. Preferably, the amount of trans content is less than the amount of cis content. Although the polybutadiene can be converted in a solid state, which can be accomplished by heating the solid polybutadiene in an inert atmosphere for a sufficient time period, preferably the post-polymerized polybutadiene is left in solution. Suitable solvents include, but are not limited to, benzene and toluene. The concentration of the polybutadiene in solution prior to conversion is between about 0.2% and about 10%, and preferably between about 0.5% and about 5%. Preferably, the concentration of polybutadiene in solution is about 1%. The polybutadiene is then isomerized or converted in solution from a primarily cis-polybutadiene to an increased trans-polybutadiene content without inducing significant amounts of crosslinking, cyclization or gel formation.

In one embodiment, the isomerization is a radiation sensitized isomerization. Since the polybutadiene is transparent to certain wavelengths of radiation, this embodiment includes adding an amount of sensitizer to the polybutadiene solution. Suitable sensitizers include, but are not limited to, organic bromine compounds, organic sulfur compounds including organic sulfides and disulfides, mercaptans, and combinations thereof. Examples of these sensitizers include allyl bromide, carbon tetrabromide, bromobenzene, phenyl sulfide, allyl sulfide, phenyl disulfide, isobutyl disulfide, allyl mercaptan, thio-2-naphthol and elemental bromine. When isoprene rubber is converted, suitable sensitizers include diphenyl disulfide, dibenzoyl disulfide, ethylene bromide, n-butyl mercaptan, thiolbenzoic acid and ethyl bromide.

A sufficient amount of sensitizer is added to form between about a 10% solution to about a 15% solution by volume in the polybutadiene solution. Preferably, a sufficient amount of sensitizer is added to form about a 12.5% solution. Alternatively, between about 1 and about 2 g of sensitizer are added for each 100 ml of polybutadiene solution. Preferably, about 1.5 g of sensitizer are added for each 100 ml of polybutadiene solution.

After the desired type and amount of sensitizer is added, the mixture of polybutadiene and sensitizer is placed under either an atmosphere of air or inert gas. Preferably, the mixture is placed under an inert atmosphere to prevent undesired reactions such as oxidative scission. Suitable inert atmospheres include nitrogen and argon. With the mixture in the appropriate atmosphere, the mixture is exposed to radiation for a sufficient period of time to cause isomerization of the polybutadiene to increased trans-polybutadiene content.

Suitable radiation includes electron beams, ultraviolet (UV) radiation, gamma radiation, X-rays, or any other high energy radiation source and at a suitable temperature. Preferably, the radiation source is UV radiation or gamma radiation. A mercury arc lamp, for example, can be used to supply the necessary UV radiation.

In an alternative embodiment, the isomerization is a thermal-type isomerization. In this embodiment, the primarily cis-polybutadiene solution is mixed with a catalyst compound that generates bromine or thiol radicals on thermolysis. Preferably, this compound is gaseous nitrogen dioxide. Initially, the polybutadiene solution is heated to the desired temperature. Suitable temperatures are from about 30° C. to about 100° C. In one embodiment, the polybutadiene solution is heated to a temperature between about 90° C. to about 100° C., preferably about 96° C. Once heated, a sufficient amount of the catalytic compound is added to cause isomerization of the polybutadiene to increased trans-polybutadiene content. In one embodiment, the catalytic compound is added to the polybutadiene solution in a mole percent from about 5% up to about 25%, for example about 6%, about 11.7% and about 23.5%. The polybutadiene solution and catalytic compound are mixed under a suitable atmosphere. Preferably, the atmosphere is an inert argon atmosphere. The mixture is maintained at an elevated temperature for a time period of up to about 2.5 hours.

In general, the primarily trans-polybutadiene reaction product contains less than about 7 percent vinyl isomer (1,2-polybutadiene isomer) content based on the total polybutadiene. Preferably, the solution-converted trans-polybutadiene reaction product contains less than about 4 percent vinyl isomer. More preferably, the polybutadiene reaction product includes less than about 2 percent vinyl isomer.

Following isomerization, the solution-converted trans-polybutadiene is recovered from the solution. In one embodiment, the polybutadiene is precipitated from the solution using an alcohol, for example methanol. Following precipitation, the polybutadiene is alcohol washed and air dried.

The recovered polybutadiene is then processed into one or more core or cover layers of a golf ball or other products such as putter inserts using methods readily available and known in the art. In order to facilitate further processing, the recovered polybutadiene can be further ground or pelletized. The recovered polybutadiene can be blended with other polymers, fillers or nano particles. The mixture is typically subjected to a compression or injection molding process. In one embodiment, the cured polybutadiene mixture is formed into a solid sphere to be used as a single piece golf ball or a golf ball core. In another embodiment, the recovered polybutadiene is formed into one or more hemispherical shells to be used in at least one intermediate layer of a core surrounding a solid center or one layer of a cover surrounding the entire core.

In one embodiment, the golf ball includes a core having at least two layers and the recovered polybutadiene mixture or blend is disposed in at least one of the two layers. In another embodiment, the golf ball includes a cover having at least two layers and the recovered polybutadiene mixture or blend is disposed in at least one of the cover layers.

In one embodiment, the recovered polybutadiene is combined with a plurality of nanoparticles having an average size of less than about 5000 nm. Suitable nano-particles include silica. Nano-particles alter the modulus of the recovered polybutadiene, because nano-particles adjust density, coefficient of restitution, and mixing time, among other things. In another embodiment, the recovered polybutadiene is combined with nano-particles and a coupling agent. Suitable coupling agents include silanes, titanates, and sulfides.

Suitable fillers include processing aids or compounds to affect rheological and mixing properties, the specific gravity, the modulus, the tear strength, and reinforcement. The fillers are generally inorganic and include various metals or metal oxides, for example zinc oxide, tin oxide, barium sulfate, zinc sulfate, calcium carbonate, barium carbonate, clay, tungsten, tungsten carbide, silicas, metal stearates (such as zinc stearate), and mixtures thereof. Fillers may also include regrinds, which are core materials from the flashes or excesses from the injection or compression molding processes that have been grounded. The fillers also include various foaming agents or blowing agents, which may be readily selected by one of ordinary skill in the art. Foamed polymer blends may be formed by using blowing agents with the resulting polybutadiene polymer. Polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g. a lower weight ball is preferred for a player having a low swing speed. Density modifying fillers are fully disclosed in commonly owned U.S. Pat. No. 6,494,795, which is incorporated herein by reference in its entirety.

The solution-converted trans-polybutadiene may also be combined with one or more additional polymers, such as thermoplastic copolyester block copolymers, dynamically vulcanized thermoplastic elastomers, hydrogenated or non-hydrogenated styrene-butadiene elastomers with functional groups such as maleic anhydride or sulfonic acid attached, thermoplastic polyurethanes or polymers made using a metallocene catalyst and combinations thereof. Suitable thermoplastic copolyetheresters include HYTREL 3078 and HYTREL 4069, which are commercially available from E.I. DuPont de Nemours & Co. of Wilmington, Del. Suitable dynamically vulcanized thermoplastic elastomers include SANTOPRENE, commercially available from Advanced Elastomer Systems of Akron, Ohio. Examples of suitable functionalized styrene-butadiene elastomers include KRATON FG-1901x and FG-1921x, which are available from the Shell Corporation of Houston, Tex. Examples of suitable thermoplastic polyurethanes include ESTANE 58133 and ESTANE 58144, which are commercially available from the B.F. Goodrich Company of Cleveland, Ohio. When the additional polymer materials are mixed with the solution-converted trans-polybutadiene, the polybutadiene is present in the resulting mixture in a concentration of at least about 50 phr, preferably at least 90 phr.

In accordance to another aspect of the present invention, the solution-converted trans-polybutadiene is blended with high trans-polybutadiene that has been polymerized without being converted in solution to form a core or a cover layer. A preferred non solution-converted high trans-polybutadiene is CB-23 available from Bayer. Solution-converted high trans-polybutadiene can also be blended with other non solution-converted rubbers such as balata, and polyisoprene, among others.

The rubber mixture containing solution-converted polybutadiene can also be blended with halogenated thiophenols, such as zinc pentachlorothiophenol. Other suitable halogenated thiophenols include those that are disclosed in commonly owned co-pending United States patent application publication no. 2003/0064826 A1, which is incorporated herein by reference in its entirety. The core mixture may also contain cross-linking agent such as a metal salt diacrylates, dimethacrylates, or mono(meth)acrylates. Zinc diacrylate is a preferred cross-linking agent. Other metal salt di- or mono-(meth)acrylates suitable for use in the present invention include those in which the metal is calcium or magnesium. The solution-converted trans-polybutadiene polymer and additional materials including additional polymers and fillers can be mixed by any method of mixing and mixing equipment readily available and known to one of ordinary skill in the art. Suitable mixing methods include single pass and multi-pass mixing. A single-pass mixing process where ingredients are added sequentially is preferred. Suitable mixing equipment includes a Banbury mixer, a two-roll mill and a twin screw extruder. Suitable mixing speeds should be high enough to impart substantially uniform dispersion of all of the mixed constituents. However, the mixing speed should not be too high, as high mixing speeds tend to break down the polymers being mixed and particularly may undesirably decrease the molecular weight of the solution-converted trans-polybutadiene. In addition, a mixing speed that is too high may result in creation of enough heat to initiate crosslinking in the polybutadiene.

As stated above, the inventive golf ball may also have one or more intermediate layers located between the cover and the core. Intermediate layers are fully disclosed in the '795 patent, which has been incorporated by reference. At least one of the intermediate layers may comprise solution-converted high trans-polybutadiene.

In general, the cover of the golf ball in accordance with the present invention provides the interface between the ball and a club. Properties that are desirable for the cover are good moldability, high abrasion resistance, high tear strength, high resilience, and good mold release. The cover typically has a thickness sufficient to provide the desired strength, performance characteristics and durability. Typically cover thicknesses are at least about 0.01 inches, for example about 0.02 to about 0.125 inches. Preferably the cover has a thickness from about 0.03 to about 0.06 inches. The golf balls also typically have at least about 60 percent dimple coverage, preferably at least about 70 percent dimple coverage, of the surface area of the cover.

In addition to the solution-converted high trans-polybutadiene, the cover of the golf balls in accordance with the present invention includes other suitable cover or intermediate layer materials. Suitable materials are well known and readily available to those of ordinary skill in the art and include thermoplastic and thermosetting materials. Preferably the golf ball cover includes ionic copolymers of ethylene and an unsaturated monocarboxylic acid, which are available, for example, under the trademark SURLYN from E.I. DuPont de Nemours & Co., of Wilmington, Del., or IOTEK or ESCOR from Exxon. These are copolymers or terpolymers of ethylene and methacrylic acid or acrylic acid partially neutralized with salts of zinc, sodium, lithium, magnesium, potassium, calcium, manganese, nickel or the like, in which the salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, maleic, fumaric or itaconic acid.

In addition, golf balls in accordance with the present invention can include one or more homopolymeric or copolymeric cover materials, including:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst;

(3) Polyurethanes, such as those prepared from polyols and diisocyanates or polyisocyanates and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly(caprolactam), and blends of polyamides with SURLYN, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX, sold by ELF Atochem of Philadelphia, Pa.;

(8) Polyphenylene oxide resins or blends of polyphenylene oxide with high impact polystyrene as sold under the trademark NORYL by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL by E.I. DuPont de Nemours & Co. of Wilmington, Del., and LOMOD by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers;

(11) Blends of thermoplastic rubbers with polyethylene, propylene, polyacetal, nylon, polyesters, cellulose esters, and the like;

(12) Fully neutralized ionomers, disclosed in published patent application '826 discussed above; and

(13) Metal salt of a fatty acid

Preferably, the cover includes polymers, such as ethylene, propylene, butene-1 or hexene-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethelyne vinyl alcohol), poly(tetrafluoroethylene) and their copolymers including functional comonomers, and blends thereof. Suitable cover compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. More preferably, in a low spin rate embodiment designed for maximum distance, the acrylic or methacrylic acid is present in about 15 to 35 weight percent, making the ionomer a high modulus ionomer. In a high spin embodiment, the cover includes an ionomer where an acid is present in about 10 to 15 weight percent and includes a softening comonomer. The outer surface of an inner cover layer may be treated prior to application of an outer cover or core, by one or more of halogenation, chemical surface modification or treatment, UV radiation, electron beam exposure, microwave radiation, coating (via spray, dip, or electrostatic application), plasma, or corona discharge, as described in co-pending U.S. patent application Ser. No. 09/389,058, which is incorporated herein by express reference thereto. Preferably, the treatment will increase adhesion of the inner cover layer to the outer cover or core.

Figure 2:
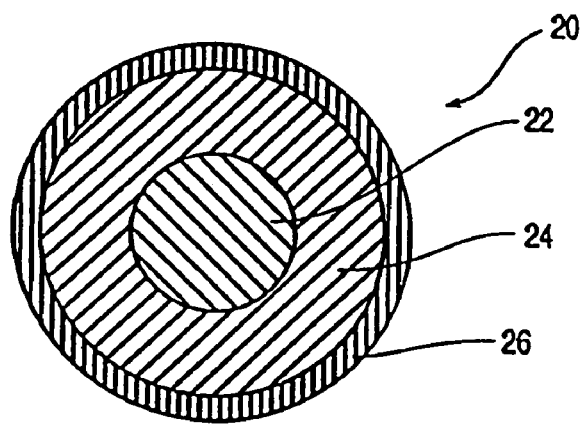
FIG. 2 illustrates a cross-section of a golf ball having an intermediate layer between a cover and a center according to the invention.
Figure 3:
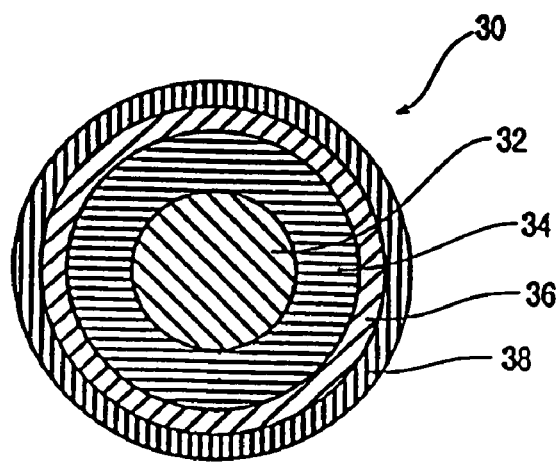
FIG. 3 illustrates a cross-section of a golf ball having more than one intermediate layer between a cover and a center according to the invention.

The figures illustrate several embodiments of golf balls in accordance with the present invention. Referring to FIG. 1, a solid core golf ball 10 in accordance with one embodiment of the present invention contains core 12 and cover 16 surrounding core 12. Core 12, cover 16, or both core 12 and cover 16 contain the solution-converted trans-polybutadiene of the present invention. As illustrated in FIG. 2, a multilayer core golf ball 20 in accordance with the present invention includes central spherical core 22, intermediate core layer 24 surrounding core 22 and concentric therewith and cover 26. Again, one or more of core 22, intermediate layer 24 and cover 26 can contain the solution-converted trans-polybutadiene of the present invention. Additional intermediate core layers can also be included as illustrated, for example, in FIG. 3. In this embodiment, golf ball 30 includes central spherical core 32, first intermediate core layer 34 surrounding core 32 and concentric therewith, second intermediate core layer 36 surrounding first intermediate core layer 34 and concentric therewith and cover 38. Although only two intermediate core layers are illustrated in FIG. 3, additional intermediate layers may be provided as desired.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

What is claimed is:

1. A method for making a golf ball comprising:
   (i) creating a solution of polybutadiene;
   (ii) mixing an amount of a photo-sensitizer with the polybutadiene in solution under an inert atmosphere;
   (iii) exposing the mixture to a gamma source of radiation for a sufficient amount of time to increase the amount of trans-polybutadiene in the polybutadiene in solution to a level of 20% to 60%;
   (iv) recovering the polybutadiene which comprises less than 7% vinyl isomer and is substantially free of crosslinking, cyclization and gel formation; and
   (v) forming the polybutadiene into one or more components of a golf ball.

2. The method of claim 1, wherein the step of creating a solution of polybutadiene comprise creating a solution in benzene.

3. The method of claim 1, wherein the step of creating the solution comprises creating between about a 0.5% solution and about a 5% solution of polybutadiene.

4. The method of claim 1, wherein the step of mixing the photo-sensitizer comprises creating between about a 10% solution and about a 15% solution of the photo-sensitizer.

5. The method of claim 4, wherein the photo-sensitizer comprises an organic bromine compound, an organic sulfur compound, or a mercaptan.

6. The method of claim 1, wherein sensitizer comprises allyl bromide, carbon tetrabromide, bromobenzene, phenyl sulfide, allyl sulfide, phenyl disulfide, isobutyl disulfide, allyl mercaptan, thio-2-naphthol or elemental bromine.

7. The method of claim 1, wherein the resulting polybutadiene comprises less than about 2% vinyl isomer.

8. The method of claim 1, wherein the inert atmosphere comprises nitrogen or argon.

9. The method of claim 1 further comprising the step of combining one or more additives with the recovered polybutadione.

* * * * *